Aug. 19, 1952　　　L. K. JACKSON　　　2,607,051
BEDFRAME AND SPECIAL CASTER RECEIVING SOCKET CONSTRUCTION
Filed Oct. 29, 1949
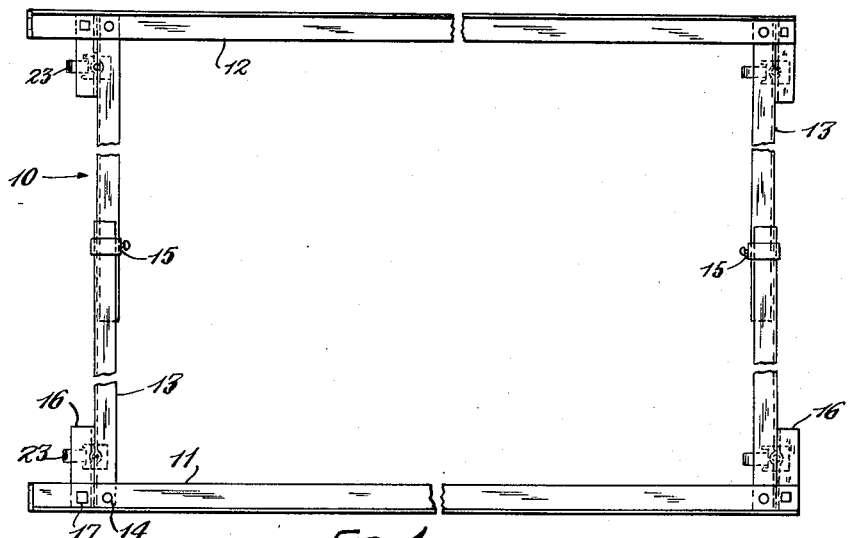
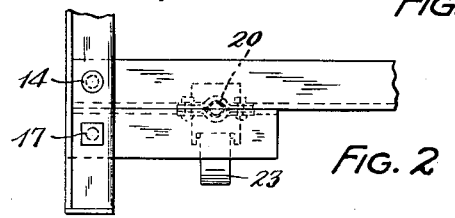
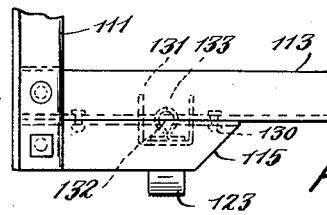
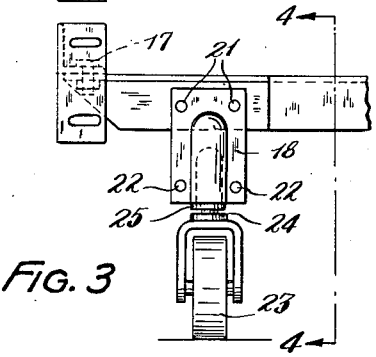
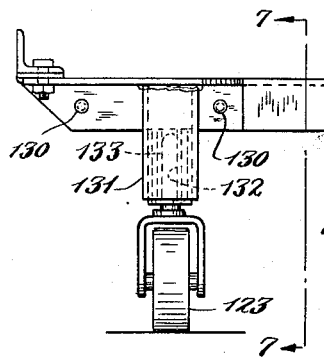
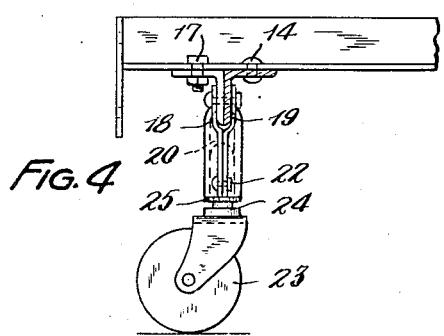
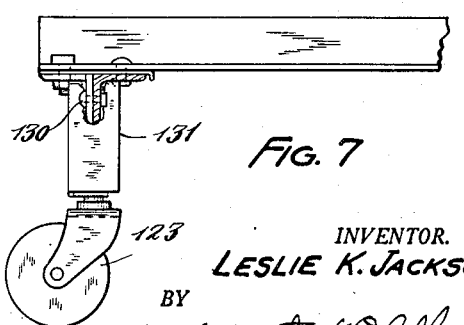
INVENTOR.
LESLIE K. JACKSON
BY West & Oldham
ATTORNEYS Patented Aug. 19, 1952

2,607,051

UNITED STATES PATENT OFFICE 2,607,051

BEDFRAME AND SPECIAL CASTER RECEIVING SOCKET CONSTRUCTION

Leslie K. Jackson, Lakewood, Ohio, assignor, by mesne assignments, to The Harvard Manufacturing Company, Cleveland, Ohio, a corporation of Ohio Application October 29, 1949, Serial No. 124,398

11 Claims. (Cl. 5—202)

1

This invention relates to bedframes, and especially to a novel type of a bedframe that has an improved caster receiving socket provided thereon.

In the recent few years, there has been an increasing desire on the part of the buying public to use a type of bedframe known as "Hollywood" bedframe one of the important characteristics of which is that there is no footboard provided on the bedframe. These bedframes usually have been made from metal and the consuming public has demanded a sturdy frame but yet one which is light in weight and one which can readily be moved about in the bedroom to facilitate making the bed and cleaning under it. Thus the frames are provided with casters which usually are of the type that "trail" or "track" and this simplifies and facilitates rolling the bedframes about in the bedroom. In a caster of this type it is necessary that the support axis of the caster be offset from the longitudinal axis of the caster leg by which the caster is supported. This offset relation between the caster leg and the actual support shaft on which the caster wheel is journaled produces a turning moment of force which tends to pull the caster socket out of its original position. Hence in many instances bedframes of previous constructions have, under normal loads, permitted the caster receiving socket portions of the same to be bent or otherwise distorted due to the turning moment produced thereon when the bedframe is loaded. Also, in previous types of bedframes, the casters normally have been positioned at the margins of the bedframe so that it is possible to bump such casters when walking around either the foot or the head of a bedframe.

It is the general object of the present invention to provide a novel, improved type of bedframe which is of relatively light but yet sturdy construction.

Another object of the invention is to provide a relatively inexpensive, easily assembled bedframe wherein caster sockets are provided that are aligned with the vertically extending central axis of the caster support member.

A further object of the invention is to provide a bedframe which can be shipped in a disassembled, compact package but which readily can be assembled to provide a solid bedframe.

Still another object of the invention is to provide a bedframe wherein the caster receiving sockets are laterally inwardly offset with relation to the margins of the bedframe.

The foregoing and other objects and advantages of the invention will be made more apparent as the specification proceeds.

For a better understanding of the invention, reference should be had to the accompanying drawings, wherein:

2

Fig. 1 is a plan of a bedframe embodying the principles of the invention;

Fig. 2 is a fragmentary enlarged plan of one corner construction of the bedframe of Fig. 1;

Fig. 3 is a side elevation of the portion of the bedframe of Fig. 2;

Fig. 4 is a vertical sectional view taken on line 4—4 of Fig 3;

Fig. 5 is a fragmentary plan view, similar to Fig. 2, of a modification of the invention;

Fig. 6 is a side elevation of the portion of the bedframe shown in Fig. 5; and

Fig. 7 is a vertical section taken on line 7—7 of Fig. 6.

To simplify correlation between the accompanying specification and the drawings, corresponding numerals are used to refer to corresponding parts used in the drawings and specification.

The details of the drawings show that a frame 10 is provided, which frame 10 is usually made from metallic components. This frame includes a pair of side rails 11 and 12 which usually are formed in the shape of angles that have one substantially horizontally disposed leg and one vertically upwardly extending leg. These side rails 11 and 12 each carry adjacent each end thereof a cross rail, or cross rail section 13. Preferably the cross rails 13 are pivotally engaged with the side rails 11 and 12 by means of rivets 14 so that the cross rails 13 are positioned flush against the lower surfaces of the side rail and are pivotal with relation thereto. Usually each cross rail section 13 extends substantially halfway across the bedframe 10 to be made from the cross rails and side rails of the invention. Each cross rail usually is in telescoped engagement with a corresponding cross rail positioned on a similar end of the other side rail of the bedframe and clamps 15 are provided for engaging with the telescoped portions of the cross rails for retaining them in a desired position so as to form a bedframe 10 of desired width.

As an important feature of the present invention, a reinforcing angle 16 is associated with each cross rail 13 adjacent the end thereof which is in engagement with the side rail that positions such cross rail. These reinforcing angles 16 are usually made from metal and are of right angular shape in cross section with one leg of the angle 16 being substantially horizontally disposed and being flush against, or abutted against the lower surface of the side rail, whereas a vertically extending leg of the angle 16 is in each instance downwardly extending and is also flush up against, or abutted against a vertically downwardly extending leg of the cross rail with which such reinforcing angle is associated. As hereinafter explained in more detail, the reinforcing angles in every instance form a unit with the cross rails with which they are associated. Thus in order to position the cross rails in desired substantially normal relationship to the side rails 11 and 12, bolts 17, or other means, usually removable, engage with the side rails 11 and 12 and with each reinforcing angle 16 in the substantially horizontally extending legs thereof. Thus these bolts 17 will, in combination with the rivets 14, secure the cross rails 13 in a desired fixed relationship to the side rails and will provide a bedframe of desired shape and of sturdy construction. By use of the particular type of side rail and cross rail construction referred to hereinbefore, it is possible to hold the cross rails 13 axially inwardly of the bedframe so that they at least substantially coincide with the side rails positioning same. Hence the bedframe 10 can easily be shipped in a knockdown, compact condition but yet the components of the bedframe can easily be assembled in operative relationship when the bedframe is to be assembled. The heads of the bolts 17 may be rounded and substantially flush with the surfaces of the side rails.

Figs. 2–4 of the drawings show a salient component of the frame 10 and this relates to the provision of a pair of socket, or caster socket plates 18 and 19. A pair of such socket plates 18 and 19 are associated with each assembly of a cross rail and a reinforcing angle. These socket plates 18 and 19 both have substantially vertically extending laterally offset recesses 20 provided therein with a pair of such recesses 20 being adapted to combine to form a retainer for a caster leg receiving socket 25. It should be noted that the upper ends of the socket plates 18 and 19 are fixedly secured to each other and to the cross rail and reinforcing angle with which they are associated by means of conventional securing devices such as rivets 21, which rivets 21 also secure the reinforcing angle to the cross rail associated therewith. The lower ends of the socket plates 18 and 19 are also secured together in any desired manner which usually comprises securing means such as rivets 22 extending therethrough for fixedly retaining the socket plates 18 and 19 in engagement at the lower portion thereof. Thus a caster 23 can readily be positioned in engagement with the recesses 20 by engaging the caster leg 24 with the caster socket 25 inserted between the recesses 20. As an important feature of the invention, the recesses 20 combine to provide a caster socket which is vertically aligned with the abutted vertically extending surfaces of the cross rail and the reinforcing angle associated therewith whereby load applied to the unit formed by a cross rail 13 and a reinforcing angle 16 is applied to the vertical center line thereof. Hence even though this load applied to such frame unit may comprise a turning moment, the reinforcing relationship between the cross rails and the reinforcing angle will permit such members to be made from relatively lightweight material but which material will effectively carry relatively heavy loads without any distortion of such load receiving members.

In the modification of the invention shown in Figs. 5–7, a side rail 111 is shown that has a cross rail 113 engaged therewith whereas a reinforcing angle 115 is also shown in association with the cross rail. In this instance, rivets 130 may be engaged with the dependent leg portions of the reinforcing angles and cross rails to secure them together. Again, a caster receiving socket is provided that is vertically aligned with the abutted, vertically extending leg portion of the reinforcing angle and cross rail. The caster positioning means include a substantially U-shaped in section frame 131 that is in overlying engagement with the dependent legs of the cross rails 113 and reinforcing angles 115 and is suitably secured thereto, as by welding. Fig. 5 best shows that the frame 131 extends laterally from the dependent legs of the reinforcing angles and cross rails in both directions in order to have more rigid relationship therewith since the upper end of the frame 131 normally abuts against the substantially horizontally directed leg provided on the cross rails and reinforcing angles. A caster engaging socket 132 is provided in a socket plate 133 that is positioned within the frame 131 and secured thereto in any desired manner, such as welding. A suitable caster 123 is shown engaged with the socket 132 provided in the socket plate 133.

From the foregoing, it will be seen that a novel type of a bedframe has been provided wherein the frame components can easily be shipped in a disassembled condition but which components are readily adapted to be secured in a fixed operative association with each other. This bedframe is made from substantially conventional members since usually both the side rails and cross rails can be formed from lightweight metallic angles of conventional construction. These lightweight frame components can easily and inexpensively be assembled to produce a sturdy frame that cannot be easily distorted. The only operations required in assembling a bedframe of the invention for use would be to engage the bolts 17 with the bedframe and to secure the clamp 15 to the cross rails. The special reinforcing means used do not interfere with lateral adjustment of the frame and they also permit the casters to be positioned laterally inwardly of the frame. Hence it is submitted that the objects of the invention have been achieved.

While several complete embodiments of the invention have been disclosed herein, it will be appreciated that modifications of these particular embodiments of the invention may be resorted to without departing from the scope of the invention as defined by the appended claims.

Having thus described my invention, what I claim is:

1. In a metallic bedframe, a pair of side rails, a pair of cross rail sections pivotally secured to each of said side rails with one of said cross rail sections being adjacent one end of each of said side rails, corresponding said cross rail sections on said side rails detachably secured together to form the cross rails of the frame and being of right angle shape in section with one dependent leg and one leg flush against the lower surface of said side rails, a reinforcing angle positioned at the end of one of each said cross rail section at said side rails, said reinforcing angles having right angle shape in section with one leg flush against the lower surface of one of said side rails and one leg of each angle abutted against the dependent leg of each of said cross rail sections; a pair of caster socket plates adjacent each corner of the frame each having a vertically directed caster leg receiving an outwardly offset recess formed at the lower ends thereof, rivet means permanently securing said socket plates together, other rivet means permanently securing said socket plates and dependent legs of said reinforcing angles and said cross rail sections together with said offset recesses mating to form caster leg receiving sockets and being centered vertically on axes passing through the abutted dependent leg surfaces of such angles and cross rail sections, each said cross rail section being so secured to one of said side rails to permit folding said cross rail sections in to coincide with said side rails, and removable means for securing said reinforcing angles to said side rails to extend normally therefrom.

2. In a bedframe, a pair of side rails, a pair of cross rails secured to each of and extending between said side rails with one cross rail being adjacent corresponding ends of said side rails, said cross rails being of right angle shape in section and having one dependent leg, a reinforcing angle positioned at the end of each said cross rail at one of said side rails, said reinforcing angles having right angle shape in section with one leg of each angle abutted against the dependent leg of one of said cross rails, pairs of caster socket plates each having a vertically directed caster leg receiving an outwardly offset recess formed in the lower ends thereof, and rivet means permanently securing said socket plates together at their lower ends and other rivet means permanently securing said socket plates and dependent legs of said reinforcing angles and said cross rails together with said offset recesses being centered vertically on axes passing through the abutted dependent leg surfaces of such angles and cross rails.

3. In a bedframe, a pair of side rails, a pair of cross rail sections carried by each of said side rails with one cross rail section adjacent one end of each of said side rails, corresponding cross rail sections detachably secured together to form the cross rails of the frame and being of right angle shape in section with one dependent leg, a reinforcing angle positioned at the end of each said cross rail section at one of said side rails, said reinforcing angles having right angle shape in section with one leg of each angle abutted against the dependent leg of one of said cross rail sections, rivet means securing said dependent legs of said reinforcing angles and said cross rail sections together, means pivotally securing each said cross rail section to one of said side rails to permit folding said cross rail sections in to coincide substantially with said side rails, and removable means for securing said reinforcing angles to said side rails to extend substantially normally therefrom.

4. In a bedframe, a side rail, a cross rail secured to and extending substantially normally from said side rail, said cross rail having a downwardly extending leg, a reinforcing angle of substantially right angle shape in cross section secured to said side rail, said reinforcing angle being relatively short and having a downwardly extending leg abutted against the downwardly extending leg of said cross rail, a pair of recessed plates one of which is flush against a surface of and protrudes downwardly from each of said downwardly extending legs with the recesses mating to form a downwardly open caster socket in vertical alignment with the abutted surfaces of said downwardly extending legs, and means securing said plates to said legs.

5. In a bedframe, a cross rail having a downwardly extending leg, a reinforcing angle of substantially right angle shape in cross section, said reinforcing angle being relatively short and having a downwardly extending leg abutted against the downwardly extending leg of said cross rail, a pair of recessed plates one of which is flush against a surface of and protrudes downwardly from each of said downwardly extending legs with the recesses mating to form a downwardly open caster socket in vertical alignment with the abutted surfaces of said downwardly extending legs, and means securing said plates to said legs and said legs to each other.

6. In a bedframe, a side rail, a cross rail secured to and extending substantially normally from said side rail, said cross rail having a downwardly extending leg, a reinforcing angle of substantially right angle shape in cross section secured to said side rail, said reinforcing angle being relatively short and having a downwardly extending leg abutted against the downwardly extending leg of said cross rail, and a socket member secured to said downwardly extending legs to secure them together and to provide a downwardly open socket in vertical alignment with said abutted surfaces of said legs.

7. A bedframe as in claim 6 wherein said socket member includes an open ended substantially U-shaped in section frame in overlying engagement with and secured to said downwardly extending legs, and a vertical plate having a socket formed therein secured to the vertical bight portion of such U-shaped frame adjacent the lower end thereof.

8. In a bedframe or the like, a rail having a downwardly extending leg, a reinforcing angle having a downwardly extending leg abutted against the downwardly extending leg of said rail, and a pair of recessed plates one of which is against a surface of and protrudes downwardly from each of said downwardly extending legs with the recesses mating to form a downwardly open caster socket in vertical alignment with the abutted surfaces of said downwardly extending legs.

9. In a bedframe or the like, a rail having a downwardly extending leg, a reinforcing angle having a downwardly extending leg abutted against the downwardly extending leg of said rail, and a socket member secured to said downwardly extending legs to provide a downwardly open socket in vertical alignment with said abutted surfaces of said legs.

10. In a bedframe or the like, a rail having a downwardly extending leg, a reinforcing angle having a downwardly extending leg abutted against the downwardly extending leg of said rail, a caster frame carried by said downwardly extending legs and protruding downwardly therefrom, and a caster socket member carried by said caster frame to form a downwardly open socket in vertical alignment with said abutted surfaces of said legs.

11. In a bedframe or the like, a rail having a downwardly extending leg, a reinforcing angle having a downwardly extending leg abutted against the downwardly extending leg of said rail, and a socket member carried by said downwardly extending legs and protruding therebeyond to provide a downwardly open socket in vertical alignment with said abutted surfaces of said legs.

LESLIE K. JACKSON.

REFERENCES CITED

The following references are of record in the file of this patent:

UNITED STATES PATENTS

| Number | Name | Date |
|---|---|---|
| 1,017,799 | Read | Feb. 20, 1912 |
| 1,595,214 | Noelting | Aug. 10, 1926 |
| 1,717,883 | Johnson | June 18, 1929 |
| 2,523,988 | Fox | Sept. 26, 1950 |